(12) United States Patent
Masutani

(10) Patent No.: US 6,685,578 B2
(45) Date of Patent: Feb. 3, 2004

(54) GOLF BALL MOLD AND GOLF BALL

(75) Inventor: Yutaka Masutani, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 09/519,841

(22) Filed: Mar. 6, 2000

(65) Prior Publication Data

US 2003/0054902 A1 Mar. 20, 2003

(30) Foreign Application Priority Data

Mar. 5, 1999 (JP) .......................... 11-058012

(51) Int. Cl.$^7$ .................. A63B 37/00; B28B 1/16
(52) U.S. Cl. ........................ 473/351; 264/255
(58) Field of Search .................. 473/351, 367, 473/368, 370, 371, 373, 374, 377; 264/255; 425/116, 190; 249/102

(56) References Cited

U.S. PATENT DOCUMENTS

| | | | | |
|---|---|---|---|---|
| 2,376,085 A | * | 5/1945 | Radford et al. | 264/254 |
| 3,861,640 A | * | 1/1975 | Agneta | 249/102 |
| 4,337,946 A | * | 7/1982 | Saito et al. | 473/356 |
| 4,508,309 A | * | 4/1985 | Brown | 249/81 |
| 5,836,834 A | * | 11/1998 | Masutani et al. | 473/374 |
| 5,882,567 A | * | 3/1999 | Cavallaro et al. | 264/255 |
| 6,033,724 A | * | 3/2000 | Molitor | 427/135 |
| 6,129,881 A | * | 10/2000 | Puniello | 264/278 |
| 6,171,091 B1 | * | 1/2001 | Bettencourt | 425/116 |

FOREIGN PATENT DOCUMENTS

| | | | | |
|---|---|---|---|---|
| GB | 0633 116 A1 | * | 10/1990 | B29C/45/14 |
| JP | 285565 A | * | 11/1997 | A63B/37/00 |

* cited by examiner

Primary Examiner—Paul T. Sewell
Assistant Examiner—Alvin A. Hunter, Jr.
(74) Attorney, Agent, or Firm—Sughrue Mion, PLLC

(57) ABSTRACT

In connection with a golf ball comprising a core, an intermediate resin layer, and a cover, the invention provides a mold defining therein a spherical cavity for molding the resin layer. The mold is divided into a pair of mold halves each of which has at least three segments which are removably assembled to define the spherical cavity, each of the segments being provided on its cavity-defining surface with at least one projection. When the core is placed in the mold cavity, the projections support the core in place. The resin layer having perforations can be effectively molded and readily removed from the mold.

6 Claims, 5 Drawing Sheets

GOLF BALL MOLD AND GOLF BALL

This invention relates to a mold for molding golf balls. More particularly, in connection with a golf ball comprising a core, an intermediate resin layer, and a cover, the invention relates to a mold defining therein a spherical cavity for molding the resin layer.

BACKGROUND OF THE INVENTION

In the golf ball art, a number of attempts have been made for accomplishing improvements in both the distance and feel of golf balls. As to solid golf balls comprising a solid core and a cover, it is a common practice to form the core and the cover each to a multilayer structure and adjust the hardness and dimensions (e.g., diameter and gage) of the layers.

For example, U.S. Pat. No. 5,439,227 discloses a three-piece solid golf ball comprising a core, a cover inner layer and a cover outer layer wherein the cover outer layer is harder than the cover inner layer. U.S. Pat No. 5,490,674 discloses a three-piece golf ball comprising a solid core of inner and outer layers and a cover wherein the core inner layer is harder than the core outer layer.

Although the respective layers of such golf balls most often have a smooth spherical surface, there are known a few golf balls including an inside layer having a rugged surface. For the purpose of preventing the core from being off centered when the cover is injection molded over the core, it has been proposed to provide the core with radially outward extending projections. The core is placed in the spherical cavity of the mold before the cover is injection molded around the core. During the process, the projections on the core serve as support pins for holding the core at the center of the spherical cavity.

Referring to FIG. 10, there is illustrated a prior art mold 30 for molding a golf ball core having projections. The mold 30 defines a spherical cavity therein and includes at least a pair of upper and lower mold halves which are separable along the equator of the spherical cavity. Only the lower mold half 31 is illustrated in the figure. Each mold half has a cavity-defining surface 32 which is provided with dips 34. A suitable material is molded in the mold cavity to form a body 36. Since the molding material penetrates into the dips 34, the body 36 is formed on its surface with projections 38.

However, the projections 38 on the molded body 36 give rise to some problems. The projections 38 hinder removing the molded body 36 from the mold 30. Depending on the number, height and arrangement of projections, the removal of the molded body from the mold becomes difficult.

SUMMARY OF THE INVENTION

In connection with a golf ball of multilayer structure having a resin layer between a core and a cover, an object of the invention is to provide a mold defining a spherical cavity having projections for molding the resin layer, the mold having the advantage of ease of removal of the resin layer from the mold after molding and being free of substantial limits on the number and position of the projections. Another object of the invention is to provide a golf ball having the resin layer formed using the mold.

In connection with a golf ball comprising a core, a resin layer enclosing the core, and a cover enclosing the resin layer, the invention provides a mold defining therein a spherical cavity for molding the resin layer. The mold includes at least six segments which are removably assembled to define the spherical cavity. Each of the segments is provided on its cavity-defining surface with at least one projection.

Preferably, at least one of the projections on each segment has a height equal to the thickness of the resin layer and projects toward the center of the cavity. Typically, the projections have a height of 0.5 to 5.0 mm. More preferably, the projections have an axis and a cross section perpendicular to the axis, the cross section being circular and having a maximum diameter of 0.8 to 3.0 mm. Further preferably, the total number of projections on the entire segments is 6 to 500, and the projections are equidistantly spaced.

In one preferred embodiment, the mold includes a pair of mold halves which are removably mated along an equatorial plane of the spherical cavity. Each mold half is divided into at least three side segments each facing the equatorial plane. The mold may further include a mold half receptacle defining a hemispherical or frustoconical recess wherein each mold half having the side segments assembled together is received in the receptacle. The side segments are separately slidable on their outer surface along the receptacle recess so that the side segments may be removed from the receptacle.

In another aspect, the invention provides a golf ball comprising a core, a resin layer enclosing the core, and a cover enclosing the resin layer, the resin layer being molded using the mold defined above.

In the process of manufacturing a golf ball comprising a core, an intermediate resin layer, and a cover, the golf ball mold of the invention is intended to mold the resin layer around the core. Especially the golf ball which can be manufactured using the mold of the invention is of the unique structure that the resin layer is formed in its outer surface with a plurality of perforations, and the cover surrounding the resin layer protrudes into the perforations, so that the protrusions of the cover are engaged with the perforations in the resin layer.

According to the invention, the mold includes at least six segments which are removably assembled to define the spherical cavity, and each of the segments is provided on its cavity-defining surface with at least one projection. When a resin is molded in this mold, the resulting resin layer has in its outer surface with a plurality of perforations corresponding to the projections. When a cover material is molded around the resin layer, the cover material partially penetrates into the resin layer. Then the resin layer and the cover are intermixed or interdigitated at their interface to form a new layer having unique properties, enabling to impart a controlled profile of properties to the golf ball.

Since the mold is divided into at least six segments, the molded body can be removed from the mold simply by separating apart the segments although the projections are on the inner surface of the segments and have a substantial height.

The preferred embodiment wherein the projections on each segment has a height equal to the thickness of the resin layer and projects toward the center of the cavity has the advantage that when the core is held in the mold prior to forming the resin layer around the core, the core can be automatically and exactly centered because the projections play the role of support pins. This eliminates a need for core support means such as support pins which are needed in conventional molds for supporting the core in place. This, in turn, ensures effective molding.

In the further preferred embodiments wherein the mold includes a pair of mold halves, and each mold half is divided into at least three side segments, and wherein the mold half having the side segments assembled together is received in the receptacle, and the side segments are separately slidable along the receptacle recess, there are obtained advantages including easy separation of the segments and smooth removal of the molded body.

BRIEF DESCRIPTION OF THE DRAWINGS

The above and other objects, features and advantages of the invention will be better appreciated from the following description taken in conjunction with the accompanying drawings.

FIGS. 1 and 2 are an elevational cross-sectional view and a perspective view of the mold half with the segments set in place; FIGS. 3 and 4 are an elevational cross-sectional view and a perspective view of the mold half with the segments withdrawn.

FIG. 5 is a plan view of the mold half with the segments set in place; FIG. 6 is a cross-sectional view taken along lines I—I in FIG. 5; FIG. 7 is a plan view of the mold half with the segments withdrawn; FIG. 8 is a cross-sectional view taken along lines II—II in FIG. 7.

DESCRIPTION OF THE PREFERRED EMBODIMENTS

Figure 1:
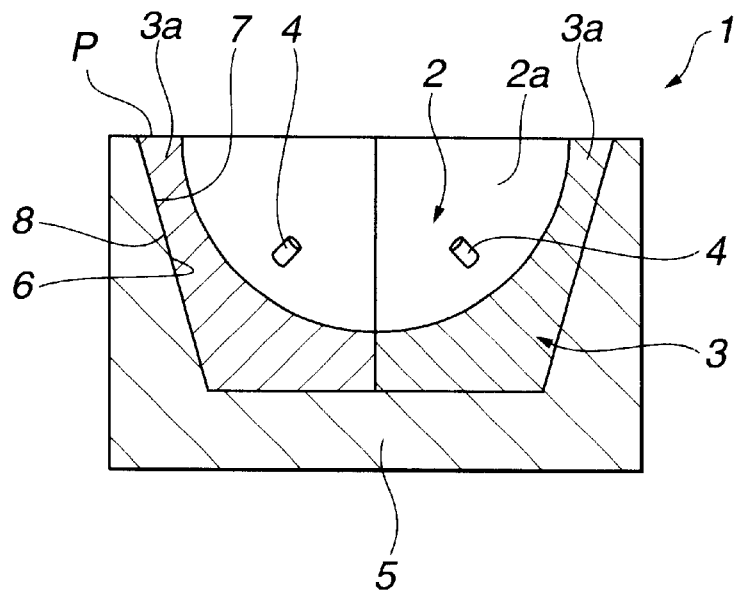
FIGS. 1 to 4 illustrate a mold according to a first embodiment of the invention and in particular a lower mold half having a plurality of segments.
Figure 2:
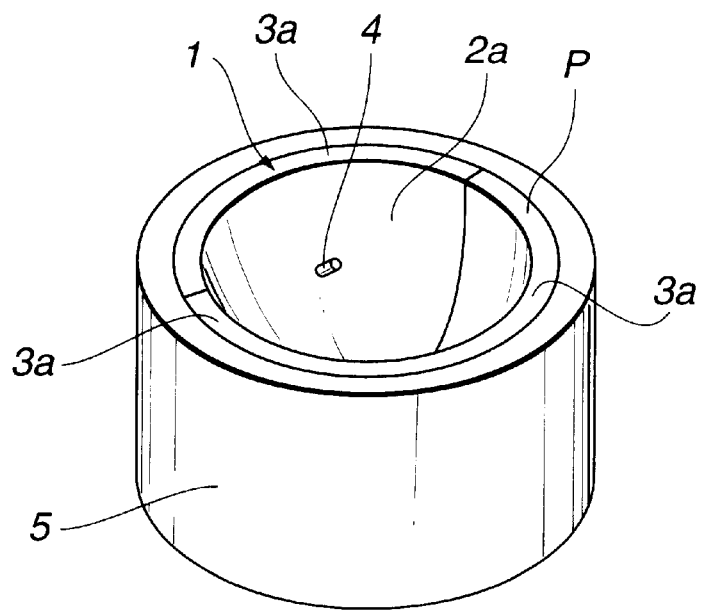
Figure 3:
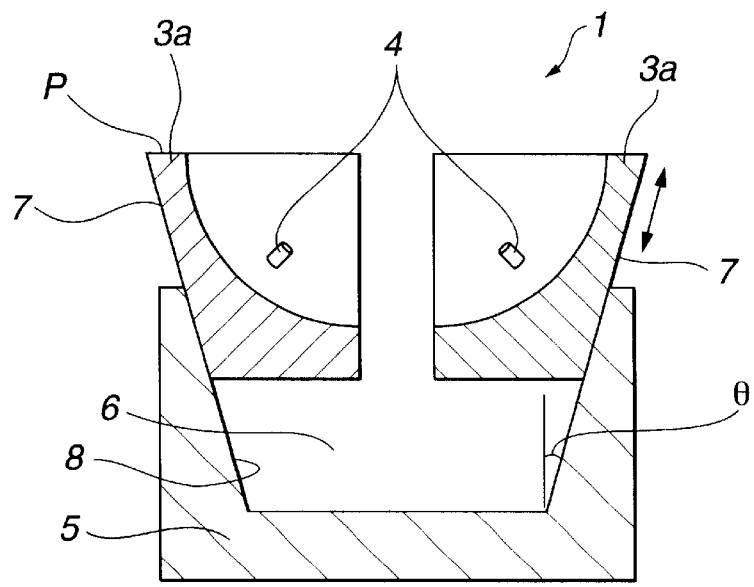
Figure 4:
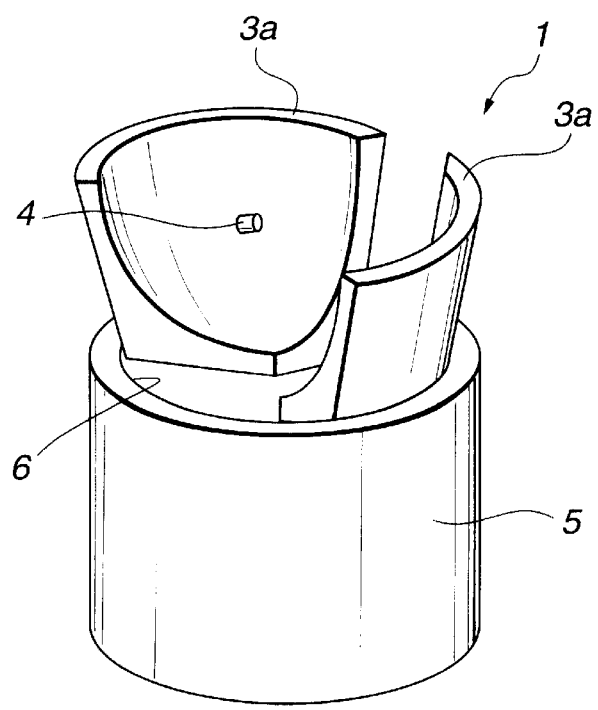

Referring to FIGS. 1 to 4, there is illustrated a lower mold half of a mold for a molding a resin layer around a core and inside a cover to be subsequently applied thereon according to the first embodiment of the invention, the lower mold half having a plurality of segments. FIGS. 1 and 2 illustrate the mold half with the segments set in place. FIGS. 3 and 4 illustrate the mold half with the segments partially withdrawn.

In the first and second embodiments, the mold includes a pair of upper and lower mold halves. Since both the mold halves are of identical structure, only the lower mold half is illustrated herein and the description of the upper mold half is omitted to avoid redundancy.

Like conventional injection molds for golf balls, the mold of the first embodiment includes a pair of an upper mold half and a lower mold half 1 which are mated together to define a spherical cavity 2 therein. The spherical cavity 2 of the entire mold is defined by separably assembling at least six segments together.

As seen from FIGS. 1 to 4, the spherical cavity 2 has a center, an equatorial plane P and opposed poles. The lower mold half 1 is removably mated with the upper mold half along the equatorial or parting plane P. As best shown in FIGS. 1 and 2, at three points circumferentially spaced apart equidistantly (or equiangularly=120°) on the equatorial plane P and along longitudes of the spherical cavity 2, the lower mold half 1 is divided into three side segments 3a of the same configuration. When the three side segments 3a are assembled together, a hemispherical cavity 2a is defined therein.

Each side segment 3a has an inner surface defining the cavity where at least one projection 4 is formed. At least three projections 4 are included in the entirety of the lower mold half 1, and at least six projections are included in the entire mold. Preferably the projection 4 projects radially inward from the segment surface toward the center of the cavity 2. The term "radial" is used with respect to the center of the spherical cavity 2 unless otherwise stated.

It is recommended herein that the projections 4 have the following specifications. It is noted that the projections each have an axis and a cross section perpendicular to the axis.

Specifications of Projection (1) Height: 0.5 to 5.0 mm, especially 1.0 to 3.0 mm (2.0 mm in the illustrated embodiment)
(2) (Maximum) diameter about the axis: 0.8 to 3.0 mm, especially 1.0 to 2.0 mm (1.5 mm in the illustrated embodiment)
(3) Shape: cylindrical, prism, conical, frustoconical, pyramid, frusto-pyramid, hemispherical shapes (cylindrical in the illustrated embodiment)
(4) Number: 6 to 500, preferably 18 to 400, more preferably 50 to 350 projections over the spherical wall with all the segments set in place (6 projections in the illustrated embodiment).

A combination of projections of different shapes and/or different heights and/or different diameters is acceptable.

Of the projections on each segment, at least one projection preferably has a height equal to the thickness of the resin layer to be molded around the core in the mold. Then, in the embodiment of FIGS. 1 to 4, at least three projections of a height equal to the resin layer thickness are included in the lower mold half 1 and serve to hold the core in the mold cavity in alignment. This ensures that the core is readily and exactly centered in the mold without a need for extra support pins.

It is preferred from the standpoint of uniform performance of the golf ball that the projections 4 be substantially uniformly distributed over the cavity wall.

In the embodiment of FIGS. 1 to 4, the lower mold half 1 with the side segments assembled together is removably received in a mold half receptacle 5. The receptacle 5 has a recess 6 of hemispherical or frusto-conical shape. In the illustrated embodiment, the recess 6 of inverted frustoconical cross-sectional shape is defined by a flat bottom surface and a divergent side surface or guide surface 8. Each segment 3a has a top face coplanar with the equatorial plane P, an inside surface defining the cavity 2a, and a divergent outside surface 7. The lower mold half 1 with the side segments 3a joined together is fitted in the recess 6 while the slant outside surface 7 of each segment 3a is slidable along the guide surface 8 of the recess 6. Upon removal of the lower mold half 1 from the receptacle 5, the side segments 3a are withdrawn obliquely upward as shown by an arrow in FIG. 3 while the side segments 3a are separated from each other and their outside surface 7 slides along the guide surface 8 of the recess 6. The withdrawn segments are shown in FIG. 4 where one segment is omitted for the sake of brevity.

The angle θ between the guide surface 8 of the receptacle 5 (or the slant outside surfaces 7 of the segments 3a) and a normal to the mold (that is, a straight line parallel to the center line passing the opposed poles of the cavity) is 15° in the illustrated embodiment although the angle θ may range from 50° to 45°, preferably from 10° to 30°. When the segments 3a are moved in the arrow direction from the set position shown in FIG. 1 to the separated position shown in FIG. 3, the distance over which the segments 3a are moved in a direction perpendicular to the normal (radially outward with respect to the center line) must be at least 80% of the maximum height of the projections 4 because otherwise removal of the molded body becomes difficult.

Any desired drive means may be provided for moving the segments 3a in the arrow direction relative to the receptacle 5 though not shown.

Figure 5:
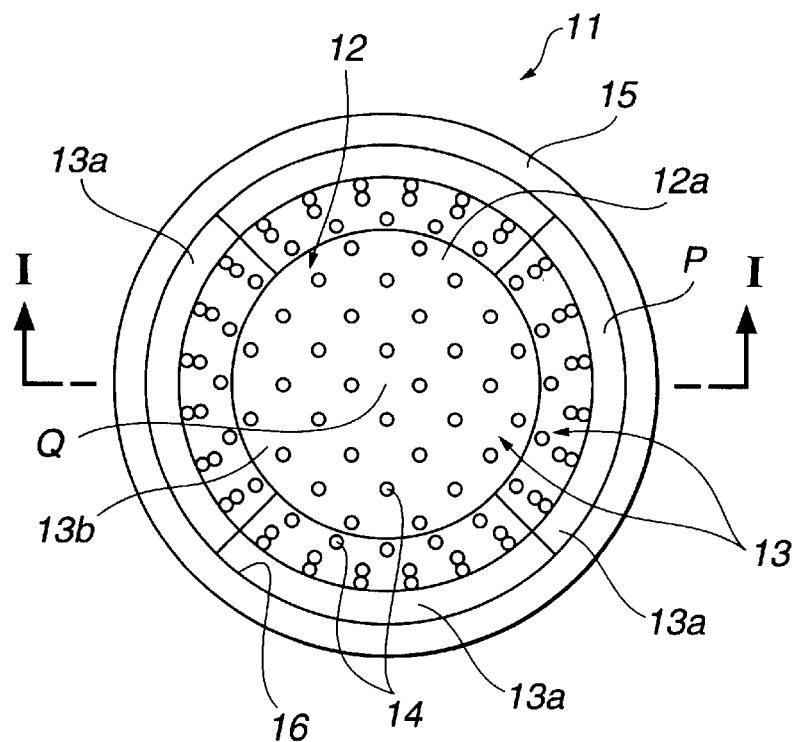
FIGS. 5 to 8 illustrate a mold according to a second embodiment of the invention and in particular a lower mold half having a plurality of segments.
Figure 6:
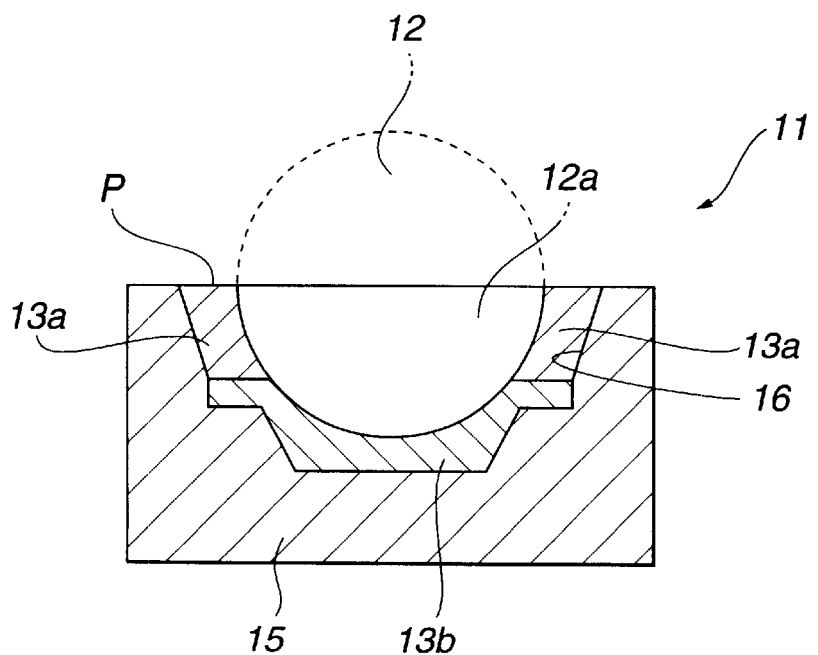
Figure 7:
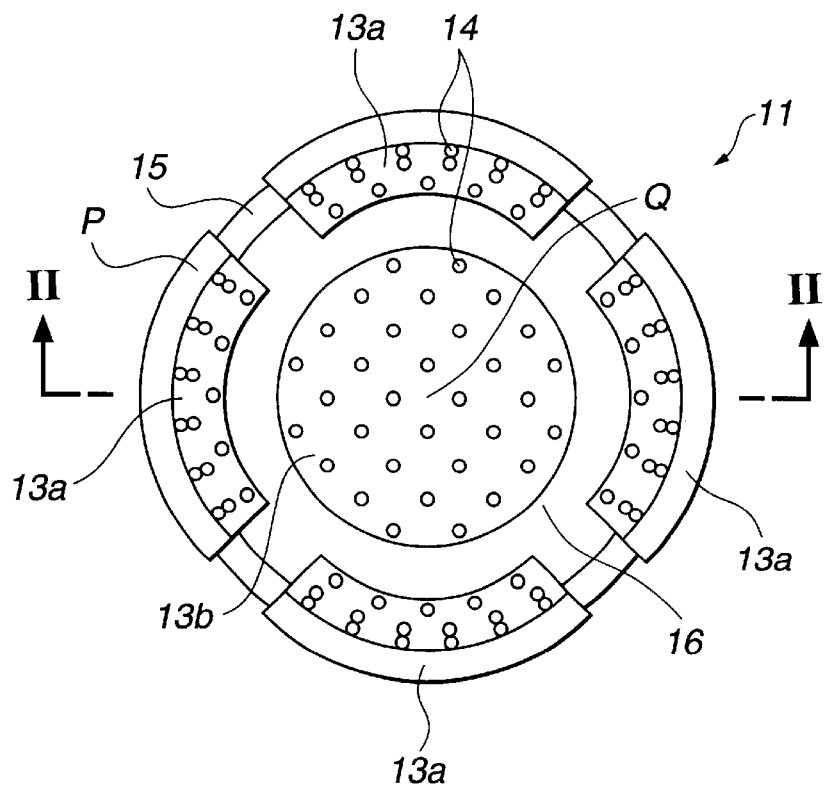
Figure 8:
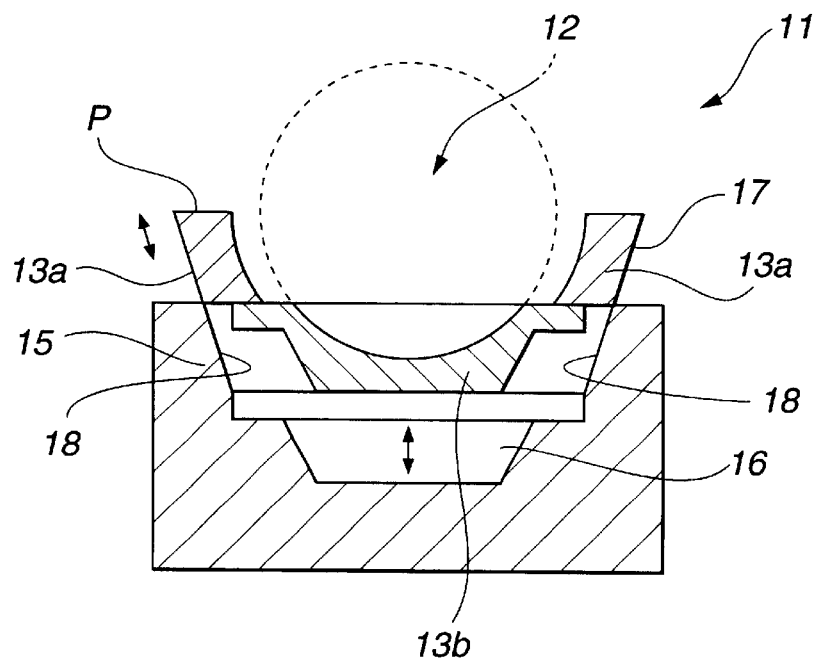

Referring to FIGS. 5 to 8, there is illustrated a lower mold half 11 of a mold for a molding a resin layer around a core and inside a cover to be subsequently applied thereon according to the second embodiment of the invention, the lower mold half 11 having a plurality of segments 13. FIGS. 5 and 6 illustrate the mold half with the segments set in place. FIGS. 7 and 8 illustrate the mold half with the segments partially withdrawn.

In the second embodiment, the lower mold half 11 is divided along a plane parallel to the equatorial plane P into a bottom segment 13b defining a cavity of circular plane shape about the bottom pole, and four side segments 13a of the same configuration which are split at four points circumferentially spaced apart equidistantly (or 90°) on the equatorial plane P and along longitudes of the spherical cavity 12. Then the lower mold half 11 consists of five segments, and the entire mold consists of ten segments. When the segments 13a, 13b are assembled together, a hemispherical cavity 12a is defined therein.

Each of the segments 13a, 13b has at least one projection 14 on its inside or cavity-defining surface. At least one of the projections 14 on each segment should preferably have a height equal to the thickness of the resin layer.

In the illustrated embodiment, the number of projections is 32 on the bottom segment 13b and 17 on each side segment 13a while the projections are uniformly distributed over the cavity-defining surface of the lower mold half 11. The total number of projections is 100 for the lower mold half 11 and 200 for the entire mold. The specifications of projections are the same as in the first embodiment.

Like the first embodiment, the second embodiment also includes a receptacle 15 defining a recess 16 having a generally divergent guide surface 18. The segments 13a, 13b are joined together to form the lower mold half which is removably fitted in the receptacle 15. Upon removal, the slant outside surface 17 of the side segments 13a is slid along the guide surface 18, and the side segments 13a are withdrawn obliquely upward in the arrow direction as shown in FIGS. 7 and 8. The bottom segment 13b is vertically movable (in the vertical arrow direction in FIG. 8).

As the bottom segment 13b is moved vertically upward by a suitable drive means (not shown), the upper end face (or upper abutment or upper periphery) of the bottom segment 13b urges upward the lower end face (or lower abutment) of each side segment 13a whereby the side segments 13a are separated from each other and the outside surface 17 of the side segments 13a is slid along the guide surface 18. The side segments 13a are withdrawn obliquely upward (in the arrow direction) while being spread apart. The molded body is then ready for removal from the mold. The closed state shown in FIGS. 5 and 6 is established by moving down the bottom segment 13b and allowing the side segments 13 to follow it.

The means for moving the segments in the arrow directions may be independently provided one for each segment.

In an alternative mode of removal, a mechanism is provided such that only the side segments 13a are slid along the guide surface 18 of the receptacle 15 in the arrow direction, with the bottom segment 13b kept stationary at the position shown in FIGS. 5 and 6.

In the golf ball molds according to the first and second embodiments, a molding material feed system is not shown. When the upper and lower mold halves are mated, an annular runner in fluid communication with a resin source is formed on the parting plane P so as to circumscribe the periphery of the spherical cavity, and a plurality of equidistantly spaced-apart gates (typically 4 to 12 gates across the equator) extend from the runner to open to the cavity. The resin compound is fed through the runner and the gates into the cavity where it is molded.

As long as the golf ball mold of the invention has the above-described construction, it may be modified without departing from the spirit of the invention. For example, the configuration and number of segments included in the upper and lower mold halves may be changed as well as the arrangement of projections.

Also contemplated herein is a golf ball comprising a core, a resin layer enclosing the core, and a cover enclosing the resin layer wherein the resin layer is formed using the mold of the invention.

The core used herein may be any of cores formed by well-known methods. It may be either a solid core or a wound core obtained by winding thread rubber around a solid or liquid center. The solid core may be a single core or consist of plural layers. A solid core of hard rubber is especially preferred for use in the invention.

The golf ball of the invention is prepared by placing a preformed core in the mold of the above-described construction and forming a resin layer therearound.

When the mold illustrated in FIGS. 1 and 2 is used, a core which has been previously formed by a separate step is placed in a set of loose segments, and the segments are tightly joined together to set up the mold. Since the cavity-defining surface of each segment is provided with a plurality of projections having a height equal to the resin layer to be formed, the core is automatically held and aligned with the cavity. Into the cavity, that is, the space between the mold and the core held therein, a resin compound is injected from the resin source through the runner and gates (typically 4 to 12 gates across the equator) which are open to the cavity. The resin layer is formed around the core in this way.

The resin compound fed into the mold may be any well-known one, for example, ionomer resins, polyamide elastomers, polyethylene elastomers, and polyester elastomers. Injection molding can be done under well-known conditions.

The thickness of the resin layer may be properly determined although it is preferably 0.5 to 5.0 mm thick, and especially 1.0 to 3.0 mm thick.

Following injection molding in the inventive mold, the resin layer enclosing the core is readily removed from the mold by slidably withdrawing the segments from the receptacle. The resin layer or molded body is formed in the outer surface with perforations corresponding to the projections.

By forming a cover over the perforated resin layer in a conventional manner, the golf ball of the invention is obtained. The cover stock used herein may be any well-known one, for example, ionomer resins, urethane resins, and balata rubber. Formation of the cover may use a conventional cover mold. Usually, the cover is provided on its outer surface with a multiplicity of dimples while the number and arrangement of dimples are not critical. The thickness of the cover is not critical although it is preferably 0.5 to 5.0 mm thick, and especially 1.0 to 3.0 mm thick.

Figure 9:
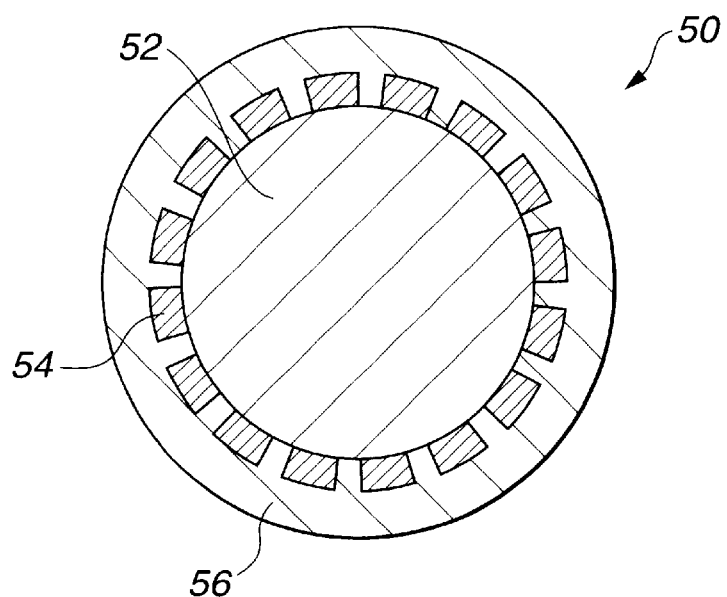
FIG. 9 is a cross-sectional view of a golf ball which can be manufactured using the mold of the invention.
Figure 10:
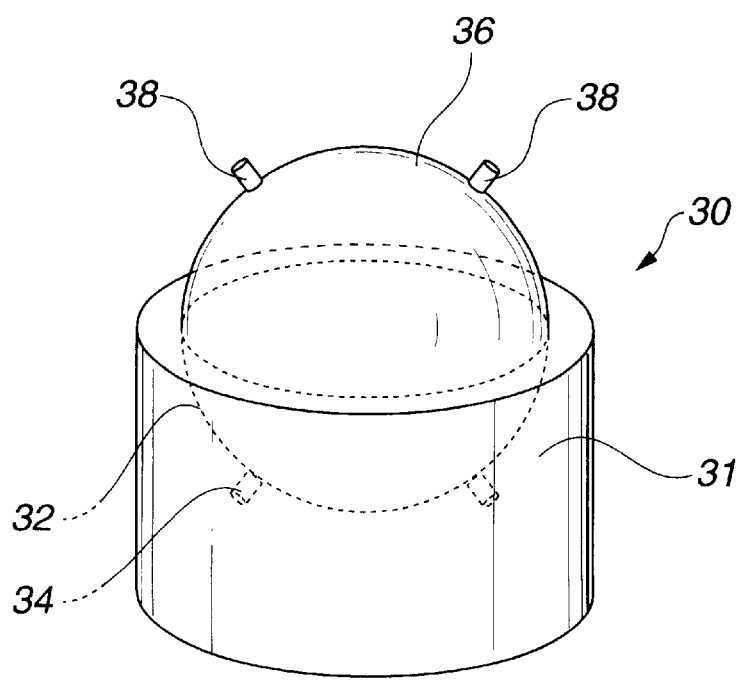
FIG. 10 illustrates a prior art injection mold.

One exemplary structure of the golf ball thus prepared is shown in FIG. 9. The golf ball 50 has a solid core 52, a resin layer 54 enclosing the core 52, and a cover 56 enclosing the resin layer 54. The resin layer 54 is formed with a plurality of perforations into which the cover stock penetrates whereby the resin layer 54 is interdigitated with the cover 56 to form a unique structure. That is, the cover stock penetrates into the perforations in the resin layer 54 to form protrusions that engage and bind with the perforations in the resin layer. By properly selecting the number and position of cover protrusions and the type of cover stock and resin, the performance of the golf ball can be improved.

The golf ball mold and the golf ball according to the invention have the following benefits.

(1) When the maximum height of projections is set to be equal to the thickness of the resin layer, the core can be readily and exactly centered in the mold prior to formation of the resin layer. These projections essentially eliminate a need for support pins.

(2) Despite the height of projections on the mold cavity wall, the molded body can be easily removed from the mold because the segments in contact with the molded body can be separated apart.

(3) Since perforations can be easily formed in the resin layer to be disposed between the core and the cover, a golf ball having a rugged interface between the resin layer and the cover is obtained.

(4) Since perforations in the resin layer corresponding to the projections on the mold cavity wall are filled with the cover material, a material different from both the core and the cover can be used as the resin layer. This results in a layer where the resin layer is intermixed with the cover and which has unique properties.

Japanese Patent Application No. 11-058012 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball mold for molding a golf ball comprising a core, a resin layer enclosing the core, and a cover enclosing the resin layer, said mold defining therein a spherical cavity for molding the resin layer, said mold comprising at least six segments, each having a spherical wall, said spherical wall being removably assembled to define the spherical cavity, wherein said spherical cavity has an equatorial plane, the mold includes a pair of mold halves which are removably mated along the equatorial plane, and each of said mold halves is divided into at least three side segments, each side segment having the same configuration and facing the equatorial plane;

wherein 6 to 500 projections in total are integral with the spherical wall of all of the segments, and the projections are equidistantly spaced, and;

wherein at least one of the projections on each of said segments has a height equal to the thickness of the resin layer and projects toward the center of the cavity, and wherein said core is centered within said cavity by said projection and not by support pins.

2. The mold of claim 1 wherein the projections have a height of 0.5 to 5.0 mm.

3. The mold of claim 1 wherein the projections has an axis and a cross section perpendicular to the axis, the cross section being circular and having a maximum diameter of 0.8 to 3.0 mm.

4. The mold of claim 1 further comprising a mold half receptacle defining a hemispherical or frustoconical recess wherein each said mold half having the side segments assembled together is received in the receptacle, and the side segments are separately slidable on their outer surface along the receptacle recess so that the side segments may be removed from the receptacle.

5. A golf ball comprising a core, a resin layer enclosing the core, and a cover enclosing the resin layer, said resin layer being molded using the mold of claim 1.

6. The mold of claim 1, wherein said mold half is divided into three or four side segments of the same configuration.

* * * * *